US012097558B2

(12) United States Patent
Travis et al.

(10) Patent No.: US 12,097,558 B2
(45) Date of Patent: Sep. 24, 2024

(54) SYSTEMS AND METHODS FOR LASER PROCESSING SYSTEM CHARACTERIZATION AND CALIBRATION

(71) Applicant: General Electric Company, Schenectady, NY (US)

(72) Inventors: Layton Seth Travis, South Lebanon, OH (US); Nicholas E. Buhr, Milford, OH (US)

(73) Assignee: General Electric Company, Schenectady, NY (US)

(*) Notice: Subject to any disclaimer, the term of this patent is extended or adjusted under 35 U.S.C. 154(b) by 745 days.

(21) Appl. No.: 17/241,888

(22) Filed: Apr. 27, 2021

(65) Prior Publication Data

US 2022/0339705 A1    Oct. 27, 2022

(51) Int. Cl.
*B22F 10/31* (2021.01)
*B22F 10/85* (2021.01)
(Continued)

(52) U.S. Cl.
CPC ............. *B22F 10/31* (2021.01); *B22F 10/85* (2021.01); *B22F 12/41* (2021.01); *B22F 12/49* (2021.01);
(Continued)

(58) Field of Classification Search
CPC .......... B22F 10/31; B22F 10/85; B22F 12/41; B22F 12/49; B22F 12/90; B22F 10/28;
(Continued)

(56) References Cited

U.S. PATENT DOCUMENTS

| 5,811,754 A | 9/1998 | Nakatani et al. |
| 5,832,415 A | 11/1998 | Wilkening et al. |
| (Continued) | | |

FOREIGN PATENT DOCUMENTS

| JP | H04237587 A | 8/1992 |
| JP | 200790352 A | 4/2007 |
| (Continued) | | |

OTHER PUBLICATIONS

Gold, et al., U.S. Appl. No. 17/183,576, filed Feb. 24, 2021.
(Continued)

*Primary Examiner* — Michael J Brown
(74) *Attorney, Agent, or Firm* — Dinsmore & Shohl LLP

(57) ABSTRACT

A method of characterizing an optical system of a laser processing system includes directing an energy beam through a plurality of portions of a sample by adjusting an orientation of an adjustable beam redirection element of the optical system in accordance with a predetermined movement pattern to form a plurality of test patterns in the sample at each portion. The optical system comprises an imaging system having an expected focal position. In the movement pattern, the energy beam is directed in a plurality of different directions in the sample in the formation of each test pattern. At least two of the plurality of test patterns are formed at different calibration distances from an expected focal position of the optical system. An accuracy of the expected focal position is determined by detecting a level of modification in the sample caused by the energy beam at the plurality of test patterns.

20 Claims, 7 Drawing Sheets

(51) Int. Cl.
*B22F 12/41* (2021.01)
*B22F 12/49* (2021.01)
*B22F 12/90* (2021.01)
*B33Y 10/00* (2015.01)
*B33Y 30/00* (2015.01)
*B33Y 50/02* (2015.01)
*G01J 1/00* (2006.01)
*G01M 11/02* (2006.01)

(52) U.S. Cl.
CPC .............. *B22F 12/90* (2021.01); *B33Y 10/00* (2014.12); *B33Y 30/00* (2014.12); *B33Y 50/02* (2014.12)

(58) Field of Classification Search
CPC ...... B22F 10/366; B22F 10/364; B33Y 10/00; B33Y 30/00; B33Y 50/02; G01M 11/02; G01J 1/00
USPC ........................................................ 700/118
See application file for complete search history.

(56) References Cited

U.S. PATENT DOCUMENTS

| | | | |
|---|---|---|---|
| 6,615,099 B1 | 9/2003 | Muller et al. | |
| 7,158,241 B2 | 1/2007 | Slesinski et al. | |
| 7,659,989 B2 | 2/2010 | Wenzel | |
| 8,687,178 B2 | 4/2014 | Deisinger et al. | |
| 2011/0220621 A1 | 9/2011 | Pieger et al. | |
| 2018/0186081 A1 | 7/2018 | Milshtein et al. | |
| 2019/0001434 A1 | 1/2019 | Liu et al. | |
| 2019/0047228 A1* | 2/2019 | Brown | G05B 19/4015 |
| 2019/0248075 A1 | 8/2019 | Klaubner et al. | |
| 2019/0337094 A1 | 11/2019 | Werner et al. | |
| 2020/0055253 A1 | 2/2020 | Knorr et al. | |
| 2020/0094482 A1 | 3/2020 | Dohler | |

FOREIGN PATENT DOCUMENTS

| | | |
|---|---|---|
| JP | 2009107153 A | 5/2009 |
| JP | 2017208445 A | 11/2017 |
| JP | 2018183806 A | 11/2018 |
| JP | 2019022976 A | 2/2019 |
| WO | 20190173000 A1 | 9/2019 |

OTHER PUBLICATIONS

Buhr, U.S. Appl. No. 16/703,292, filed Dec. 4, 2019.
Japanese Patent Office Action for Application No. 2022-073479 dated Sep. 25, 2023 (16 pages).
Extended European Search Report for application 22166899.9 mail date Aug. 19, 2022 (11 pages).
Japanese Patent Office Action for Application No. 2022-073479 dated Feb. 19, 2023 (5 pages with English Translation).

* cited by examiner

SYSTEMS AND METHODS FOR LASER PROCESSING SYSTEM CHARACTERIZATION AND CALIBRATION

BACKGROUND

Field

The present disclosure generally relates systems and methods for characterizing an energy beam within a three-dimensional space and, more particularly, to systems and methods for measuring aspects of a beam profile and a focal position of a laser processing system.

Technical Background

Material processing systems relying on an energy beam to modify characteristics of a workpiece (e.g., additive manufacturing apparatuses, laser welding devices, laser cutting devices, or the like) may direct energy beams in predetermined patterns to generate material modifications (e.g., melt or fuse a portion of material) having a desired shape. To ensure that the energy beam produces desired material modifications in the workpiece, information regarding various aspects of the energy beam (e.g., beam shape and energy density profile) where the energy beam interacts with the workpiece is needed. For instance, if the material processing system directs the energy beam to the workpiece using an optical system, generation of the predetermined patterns based on an inaccurate focal position of the optical system may lead to undesired material modifications because the energy beam may lack the requisite energy density to modify a workpiece in an intended manner.

Certain material processing systems may include elements that introduce other directionally-dependent characteristics (e.g., beam geometry) into the energy beam. Such directionally-dependent characteristics may also alter the energy beam's ability to modify a workpiece and therefore should be accounted for to ensure that directing the energy beam in a particular pattern modifies the workpiece as intended.

SUMMARY

According to an embodiment of the present disclosure, a method of characterizing an optical system of a laser processing system includes directing an energy beam through a plurality of portions of a sample by adjusting an orientation of an adjustable beam redirection element of the optical system in accordance with a predetermined movement pattern to form a plurality of test patterns in the sample at each portion. The optical system comprises an imaging system having an expected focal position. In the movement pattern, the energy beam is directed in a plurality of different directions in the sample in the formation of each test pattern. At least two of the plurality of test patterns are formed at different calibration distances from an expected focal position of the optical system. An accuracy of the expected focal position is determined by detecting a level of modification in the sample caused by the energy beam at the plurality of test patterns.

In another embodiment of the present disclosure, a method of determining a focal position of an optical system of a laser processing system includes positioning a sample a plurality of different distances of a distance range from the optical system. The distance range includes an expected focal position of the optical system. For each distance, an energy beam is directed through a separate portion of the sample in a predetermined movement pattern using an adjustable beam redirection element of the laser processing system to form a plurality of test patterns in the sample at each portion. The movement pattern includes a plurality of movements such that the energy beam is directed in a plurality of different directions in the sample in the formation of each test pattern. The method includes inspecting the plurality of test patterns to determine whether the expected focal position matches or substantially matches an actual focal distance of the optical system.

In another embodiment of the present disclosure, a laser processing system includes an energy beam source configured to emit an energy beam, an adjustable beam redirection element configured to direct the energy beam towards a support platform based on a configuration of the adjustable beam redirection element, and a support platform actuator coupled to the support platform. The support platform actuator is movable in a direction to adjust a distance between the support platform and the adjustable beam redirection element. The laser processing system also includes an optical system disposed between the energy beam source and the support platform, the optical system having a focal position where an energy density of the energy beam is a maximum. The laser processing system also includes a detector having a field of view that captures the support platform and a controller communicably coupled to each of the adjustable beam redirection element, the support platform actuator, and the detector. The controller is configured to direct the support platform to move to a plurality of distances of a distance range from the adjustable beam redirection element. The distance range includes an expected focal position of the optical system. The controller is also configured to cause the adjustable beam redirection element to direct the energy beam through a separate portion of a sample, for each of the plurality of distances, placed on the support platform in a predetermined movement pattern to form a plurality of test patterns in the sample at each portion. The predetermined movement pattern comprises a plurality of movements such that the energy beam is directed in a plurality of different directions in the sample in the formation of each test pattern. The controller is also configured to: capture an image containing the plurality of test patterns using the detector; and analyse the image to determine an accuracy of the expected focal position based on an amount of material modification in the sample at each of the plurality of test patterns.

Additional features and advantages of the processes and systems described herein will be set forth in the detailed description which follows, and in part will be readily apparent to those skilled in the art from that description or recognized by practicing the embodiments described herein, comprising the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are comprised to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
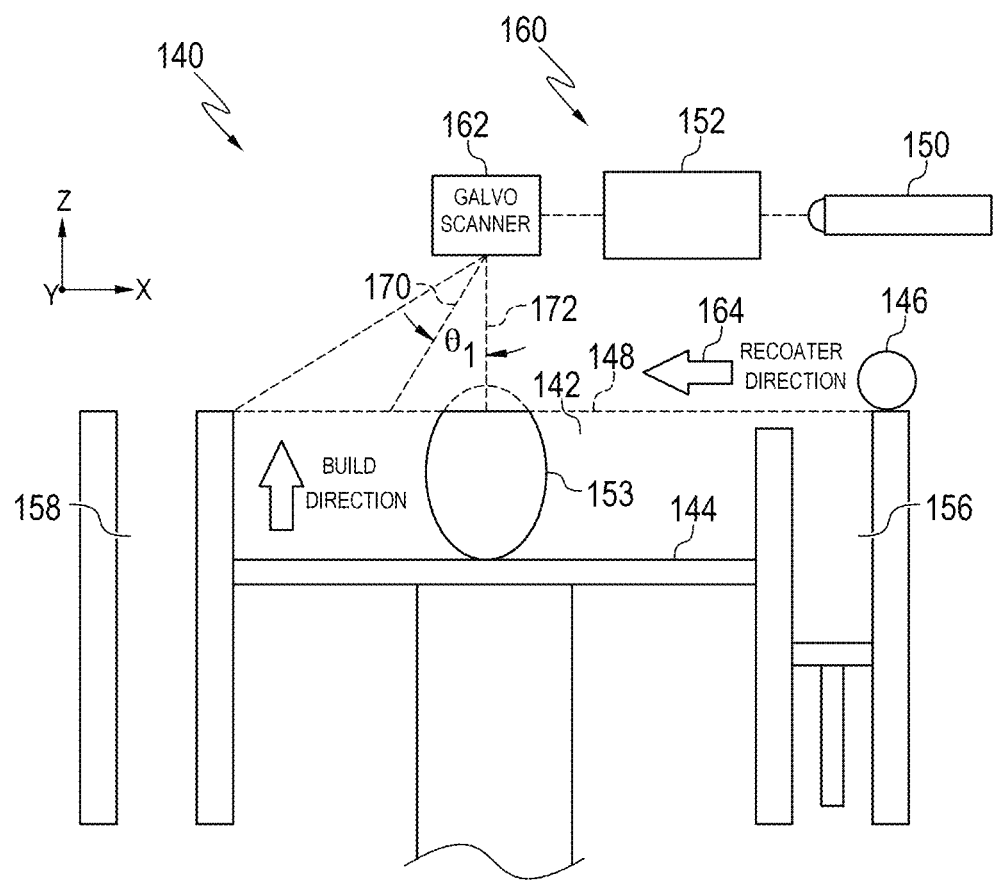
FIG. 1 depicts an additive manufacturing apparatus, according to one or more embodiments described herein.

Reference will now be made to systems and methods for characterizing a laser processing system as a function of beam position based analyzing a plurality of test patterns formed with multi-directional movement patterns of an energy beam. In various embodiments, the energy beam is directed through a plurality of portions of a sample using a predetermined multi-directional movement pattern for an adjustable beam redirection element of a laser processing system to form the plurality of test patterns. Between formation of the test patterns, the positioning of the sample may be changed such that each test pattern may be formed at a different calibration distance from an expected focal position of an optical system of the laser processing system. In embodiments, each of the test patterns is formed at a different calibration distance within a calibration distance range containing the expected focal position. For example, a first test pattern may be formed at a first calibration distance on a first side of the expected focal position, a second test pattern may be formed at the expected focal position, where the calibration distance is equal to zero, and a third test pattern may be formed at a second calibration distance on a second side of the expected focal position. The second calibration distance may equal the first calibration distance such that the expected focal position is centered in the calibration distance range. The calibration distance range in the preceding example may be expanded to include any number of test patterns (e.g., equal numbers of test patterns on either side of the expected focal position). After the formation of the test patterns, the test patterns may be compared (e.g., either directly by a user or through image analysis) to determine an accuracy of the expected focal position based on a level of material modification induced by the energy beam in each of the test patterns.

The multi-directional movement patterns described herein beneficially facilitate the characterization of several beam-modifying aspects of laser processing systems that are not characterized through existing techniques. For example, certain laser processing systems may include imaging optics that introduce an ellipticity into a beam shape of a laser beam. Such ellipticity may impact an amount of laser energy deposited in the sample along particular movement directions of the laser beam. As such, the laser beam's ability to modify the sample in a desired manner along a movement direction may depend on the direction that the laser is being directed via the adjustable beam redirection element. Additionally, laser processing systems may include optical systems possessing aberrations (e.g., astigmatism) that cause other directional dependencies (e.g., beam waist location or focal position) of the laser beam. Such additional directional dependencies may also impact the laser beam's ability to modify samples.

The multi-directional movement patterns described herein account for directional dependencies when calibrating laser processing systems, thus providing a more complete characterization of the laser processing system as a function of beam movement direction and position than conventional characterization methods. In embodiments, the multi-directional movement patterns described herein include at least two portions that extend at angles relative to one another such that the directional dependencies of the laser processing system are taken into account when forming the test patterns. In embodiments, the at least two portions that extend at angles relative to one another can include different lines such that an orientation of the energy beam's energy density cross-section with respect to the movement direction in each line changes. In embodiments, the at least two portions that extend at angles relative to one another are different segments of a non-linear curve such that the orientation of the energy beam's energy density cross-section with respect to the movement direction changes along the non-linear curve. As a result, the test patterns described herein incorporate changes in beam energy density resulting from movement direction dependences, providing a more complete characterization and calibration of the laser processing system.

Referring now to FIG. 1, a laser processing system 140 is depicted in accordance with an example embodiment. The laser processing system 140 depicted in FIG. 1 is an additive manufacturing apparatus that builds objects or portions of objects, for example, the object 153, in a layer-by-layer manner by sintering or melting a build material (e.g., a powder, not depicted) using an energy beam 170 generated by an energy beam source 150. In embodiments, the energy beam source 150 is a laser and the energy beam 170 is a laser beam. In embodiments, the energy beam source 150 is a filament and current source, and the energy beam 170 is an electron beam. In embodiments where the energy beam 170 is a laser beam, the energy beam 170 sinters or melts a cross sectional layer of the build material under control of an optical system 160.

The optical system 160 may include an imaging system 152 and an adjustable beam redirection element 162. In the example depicted, the adjustable beam redirection element 162 is a galvo scanner that may include a plurality of movable mirrors or scanning lenses. In an embodiment, the adjustable beam redirection element 162 includes a first scanning mirror (not depicted) rotatably adjustable in a first direction (e.g., the x-direction) such that a first scanning angle $\Theta_1$ is adjustable so the energy beam 170 may be scanned to cover an entirety of the build platform 144 in the first direction. The adjustable beam redirection element 162 may also include a second scanning mirror (not depicted) rotatably adjustable in a second direction (e.g., the y-direction) such that the energy beam 170 may be scanned to cover an entirety of the build platform 144 in the second direction. By adjusting the adjustable beam redirection element 162 in predetermined movement patterns, corresponding patterns in the build material may be modified (e.g., cured, melted, sintered) to produce the object 153. In embodiments, the speed which the energy beam 170 is moved is a controllable process parameter that impacts the quantity of energy delivered to a particular spot. Typical energy beam movement speeds are on the order of 10 to several thousand millimetres per second.

In embodiments, the imaging system 152 focuses the energy beam 170 to deliver a required energy density to a build surface 148 such that the build material is modified in a desired manner. While the imaging system 152 is depicted as being upstream of the adjustable beam redirection element 162, it should be appreciated that the imaging system 152 may be placed anywhere between the energy beam source 150 and the object 153 consistent with the present disclosure. As each layer of the object 153 is formed via the optical system 160, the relative distance between a build platform 144 and the optical system 160 is changed (e.g., the build platform 144 may be lowered) and an additional layer of the object 153 is formed (e.g., via a recoater 146 forming an additional layer of powder at the build surface 148 in a recoater direction 164, with any excess powder being pushed to a powder reservoir 158). For example, after the build platform 144 is lowered, another layer of build material may be spread over the build platform 144 and the object 153. The additional layer of build material may modified by moving the energy beam 170 in another pattern via the optical system 160 to form the additional layer of the object.

The energy beam 170 may be controlled by a computer system including a processor and a memory (not depicted). The computer system may determine a scanning pattern for each layer and control energy beam 170 to irradiate the build material according to the scanning pattern. After fabrication of the object 153 is complete, various post-processing procedures may be applied to the object 153. Post-processing procedures include removal of excess powder by, for example, blowing or vacuuming. Other post processing procedures include a stress relief heat treat process. Additionally, thermal and chemical post processing procedures can be used to finish the object 153.

In order to produce an object 153 having a desired shape, movement patterns for the energy beam 170 are determined based on an energy density profile of the energy beam 170 at the build surface 148. For example, certain build materials may require a threshold energy density to be modified (e.g., melted, sintered, or the like) and eventually hardened for incorporation into the object 153. The energy density profile of the energy beam 170 is typically non-uniform. For example, in embodiments, the energy density profile may be possess a Gaussian or other statistical distribution, having a variable energy density profile that gradually decreases from a maximum energy density in a central portion of the energy beam 170. As such, only a portion of the energy beam 170 (e.g., immediately surrounding a center of the energy beam 170) may possess the requisite energy density to sufficiently modify the build material for incorporation into the object 153. The portion of the energy beam 170 possessing sufficient energy density to modify the build material may change as a function of position on the build platform 144 (e.g., as a function of scanning angle $\Theta_1$) due to impacts on the energy density profile of the energy beam 170 induced by the imaging system 152. For example, astigmatism of the imaging system 152 may create a directional dependency of the beam waist (e.g., focal position, a position of maximum energy density) of the energy beam 170. A focusing position of the optical system 160 may have a first value at a home position 172 of the optical system 160 and a second value that is different from the first value at some angle $\Theta_1$ from the home position 172.

Figure 2A:
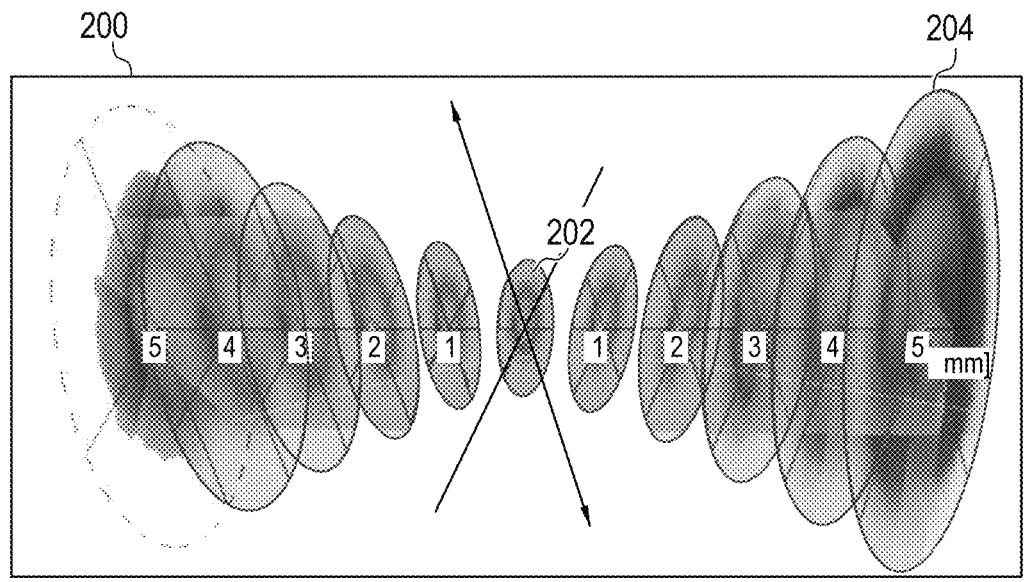
FIG. 2A depicts an energy density cross-sections for a laser beam at a plurality positions relative to a focal position, according to one or more embodiments described herein.

FIG. 2A depicts a chart 200 showing a plurality of energy density cross-sections for the energy beam 170 for a plurality positions relative to a focal position of the optical system 160. In embodiments, the energy density cross-section 202 depicted may correspond to an energy density cross-section of the energy beam 170 at the home position 172 of the optical system 160, while the energy density cross-section 204 depicted may correspond to an energy density cross section at an angle $\Theta_1$ from the home position 172. As shown, the energy density cross-section 202 covers a much smaller area than the energy density cross-section 204 at some distance (e.g., about 2 mm, about 3 mm, about 4 mm, about 5 mm, etc.) from the focal position. Given this, the energy beam 170 may not possess the requisite energy density to modify the build material for incorporation into the object 153 in a desired pattern if the movement patterns of the adjustable beam redirection element 162 do not take such a directional dependency of the focusing position of the optical system 160 into account. As such, prior to programming the movement patterns for adjustable beam redirection element 162 to create a particular object 153, it is beneficial to calibrate the laser processing system 140 to ensure the optical system 160 provides adequate energy density to the build surface 148 for each position of the adjustable beam redirection element 162.

Figure 2B:
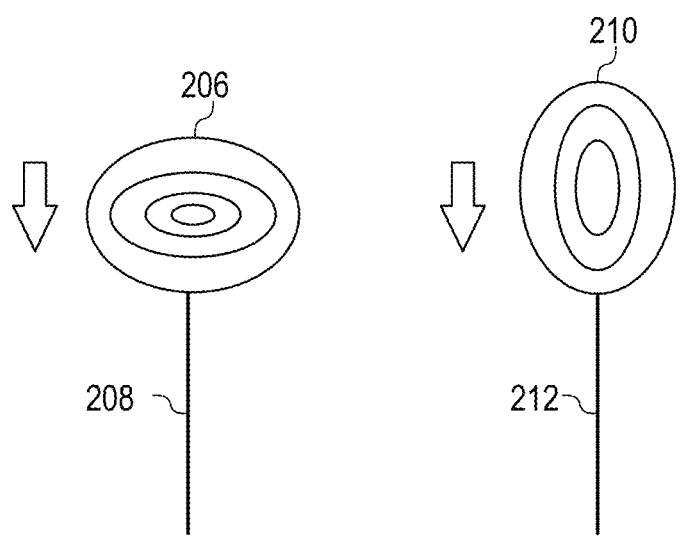
FIG. 2B schematically depicts energy density cross-sections for a laser beam relative to different movement directions, according to one or more embodiments described herein.

In embodiments, the energy density cross-section 202 possesses a substantially elliptical shape. In embodiments, the ellipticity of the energy beam 170 may depend on the orientation of the adjustable beam redirection element 162. For example, as depicted in FIG. 2A, the energy density cross-section 204 possess a greater degree of ellipticity than the energy density cross-section 202. Such a directionally-dependent ellipticity may further complicate calibration of the laser processing system 140. For example, as depicted in FIG. 2B, a first energy density cross-section 206 of the energy beam 170 may possess a first orientation relative to a first movement direction 208 for the adjustable beam redirection element 162 (e.g., a first line of a movement pattern) and the second energy density cross-section 210 may possess a second orientation relative to a second movement direction 212 for the adjustable beam redirection element 162 (e.g., a second line of a movement pattern). The second energy density cross-section 210 is substantially elliptical and has a major axis that is substantially aligned with the second movement direction 212. The first energy density cross section 206 contrasts with the second energy density cross-section 210 in that the major axis of the first energy density cross section 206 is not aligned with the first movement direction 208, but rather rotated with respect to the first movement direction 208. As a result, the average energy density of the energy beam 170 applied along the first movement direction 208 is smaller than the average energy density of the energy beam 170 applied along the second movement direction 212. Given this, the mismatch in alignment between the first movement direction 208 and the first energy density cross-section 206 may result in an insufficient energy density being applied to sufficiently modify the build material along the first movement direction 208 for incorporation into the object 153.

With the foregoing in mind, the laser processing system 140 may be calibrated in accordance with the methods described herein. Samples of test material may be placed at various locations on the build platform 144. In embodiments, the test material may differ from the build material used to build the object 153. For example, in embodiments, the test material is a metallic foil that is burned or ablated by the energy beam 170 when the energy beam 170 possesses a sufficient energy density. As described herein, various portions of the test samples may be modified by moving the energy beam 170 in a predetermined movement pattern via the optical system 160 to generate test patterns at each of the portions in the test samples. The predetermined movement pattern may include a plurality of movement directions for the adjustable beam redirection element 162 to incorporate directional dependencies of the energy density cross section of the energy beam 170 at various locations (e.g., relative to the home position 172) on the build platform 144. Various ones of the test patterns may be formed with the build platform 144 and optical system 160 being placed at different relative distances from one another (e.g., in the z-direction). An analysis and assessment of the plurality of test patterns formed in the samples of test material may be used to determine a focal position for the optical system 160 at various locations on the build platform (e.g., away from the home position 172). Additionally, the analysis and assessment of the plurality of test patterns formed in the samples of test material may be used to form a calibration model of the optical system 160 mapping where in three-dimensional space the energy beam 170 possesses a sufficient energy density to form a complete test pattern in the samples of test material. Such a calibration model may be used to determine movement patterns used by the optical system 160 to build objects 153 after the calibration.

Figure 3A:
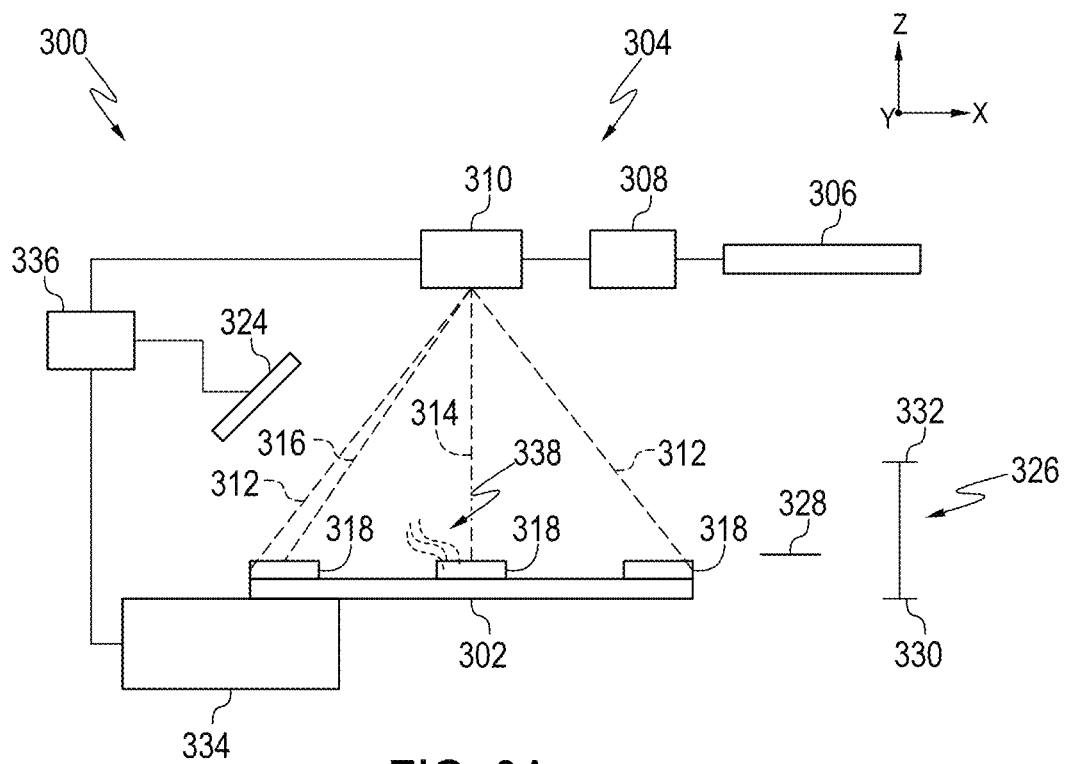
FIG. 3A schematically depicts a laser processing system including an optical system, according to one or more embodiments described herein.

Referring to FIG. 3A, a laser processing system 300 under a calibration process is schematically depicted. The laser processing system 300 includes an energy beam source 306 that produces an energy beam 316. In embodiments, the energy beam source 306 is a laser and the energy beam 316 is a laser beam. The laser processing system 300 may be any laser processing apparatus (e.g., an additive manufacturing apparatuses, a laser welding device, a laser cutting device, or the like) utilizing the energy beam 316 to modify material (e.g., melt, ablate, fuse, sinter, or the like) disposed on a support platform 302 in any manner. Additional components of the laser processing system 300 may be depend on the particular purpose of the laser processing system 300 and are left out for the purposes of simplifying the discussion herein. For example, in embodiments, the laser processing system 300 may correspond to the laser processing system 140 described herein.

The laser processing system 300 also includes an optical system 304 including an imaging system 308 and an adjustable beam redirection element 310. The imaging system 308 may include various elements (e.g., lenses, mirrors, or the like.) to focus the energy beam 316 on the support platform 302. While the imaging system 308 is shown to be disposed between the energy beam source 306 and the adjustable beam redirection element 310, it should be understood that the imaging system 308 may be disposed anywhere between the energy beam source 306 and the support platform 302. The adjustable beam redirection element 310 may include at least reconfigurable element (e.g., a scanning mirror) such that the energy beam 316 may be moved throughout a range of motion 312 to illuminate an entirety of the support platform 302 (or a portion thereof). In embodiments, the adjustable beam redirection element 310 may be similar to the adjustable beam redirection element 162 described with respect to FIG. 1.

The laser processing system 300 further includes a controller 336. The controller 336 is communicably coupled to the adjustable beam redirection element 310, a support platform actuator 334, and a detector 324. In embodiments, the controller 336 may be a controller associated with an intended mode of operation for the laser processing system 300. In embodiments, the controller 336 may constitute a calibration controller that is separate from the laser processing system 300 and specifically used for the purpose of generating a calibration model for the laser processing system 300. In embodiments, the controller 336 includes a memory storing executable instructions and a processor configured to execute the instructions to perform the calibration process described herein. For example, the controller 336 may include instructions configured to cause the adjustable beam redirection element 310 to move in predetermined multi-directional movement patterns for generating test patterns in a plurality of samples 318 disposed on the support platform 302. In embodiments, the controller 336 includes instructions configured to cause the support platform actuator 334 to change a relative position of the support platform 302 with respect to the optical system 304 during the calibration process. For example, the support platform actuator 334 may move the support platform 302 throughout a range of calibration distances 326.

In embodiments, the range of calibration distances 326 includes an expected focal position 328 of the optical system 304. In embodiments, the expected focal position 328 may constitute a calculated focal distance of the imaging system 308 (e.g., based on an optical model) at the home position 314. It should be understood that the expected focal position 328 depicted in FIG. 3A may correspond to a particular position of the energy beam 316 (e.g., the home position 314). While the calibration process is described herein as taking place using a single expected focal position 328, it should be understood that the process may take place using a number of different expected focal positions. For example, in embodiments, the calibration process may include a plurality of different expected focal positions, one for each sample 318 placed on the support platform 302 to account for directional variations in the focal position of the imaging system 308. Any number of expected focal positions may be used to set any number of ranges of calibration distances in accordance with the present disclosure.

The energy beam source 306 may produce an energy beam 316 having an initial energy density cross-section. In embodiments, the imaging system 308 may modify at least one aspect of the initial energy density cross-section to form a modified energy density cross-section. In an example, the initial energy density cross-section may have a Gaussian profile and the imaging system 308 may modify the initial energy density cross-section such that the modified energy density cross-section has an elliptical profile. Additional aberrations (e.g., astigmatism) of the imaging system 308 may induce a directional dependency of a focal position of the imaging system 308. For example, the focal position of the imaging system 308 may have a first value at a first position proximate to a home position 314 of the optical system 304 and have a second value at a second position (e.g., the position of the energy beam 316 depicted in FIG. 3) further from the home position 314. As a result, a size of the energy density cross-section of the energy beam 316 at the support platform 302 may depend on a position of the energy beam 316 relative to the home position 314.

Figure 3B:
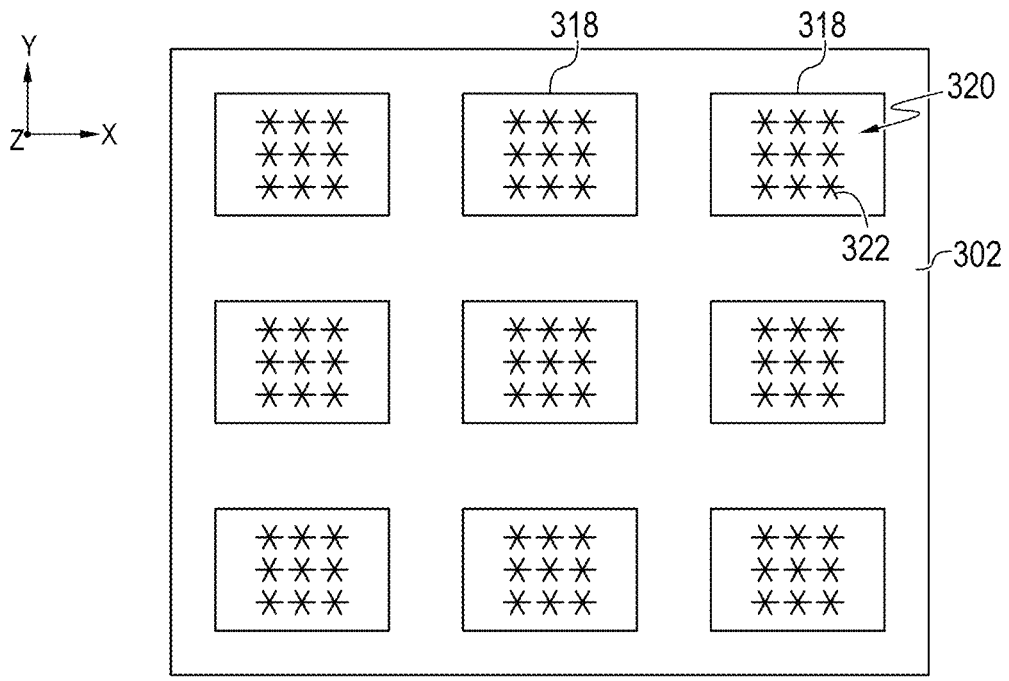
FIG. 3B schematically depicts a plan-view of a support platform having a plurality of test samples disposed thereon, according to one or more embodiments described herein.

The calibration process described herein measures such aspects (e.g., the modified energy density profile, the directional dependency of focal position) of the laser processing system 300 to facilitate the generation of movement patterns for the energy beam 316 such that the energy beam 316 modifies material in an intended manner. When under the calibration process, a plurality of samples 318 are placed on the support platform 302. As depicted in FIG. 3B, the samples 318 may be distributed throughout an entirety of the support platform 302 to characterize the energy beam 316 at a plurality of different positions on the support platform 302. In embodiments, the samples 318 are arranged in a 3×3 array that covers the range of motion 312 of the energy beam 316 so that an accurate calibration model mapping where in three-dimensional space the energy beam 316 possesses the requisite energy density to form a complete test patterns in the samples 318. It should be understood that any number of samples 318 may be placed on the support platform 302 and such samples 318 may be arranged in any manner consistent with the present disclosure.

The samples 318 may be constructed of any material capable of being modified by the energy beam 316 in a repeatable manner. In embodiments, the samples 318 are metal articles (e.g., a metal ingot, a three dimensional metal article such as a block, a metal plate, or the like). In embodiments, the samples 318 include metal articles and a powder layer (e.g., a metallic powder) disposed on a surface of the metal article. In embodiments, the samples 318 are metallic foil sheets that are melted when the energy beam 316 is incident on the samples with a requisite energy density. In embodiments, the samples 318 are constructed of laser paper, and the test patterns are burned areas on the samples 318. In embodiments, if the energy beam 316 does not possess the requisite energy density, the samples 318 do not melt or burn but may be modified in a less conspicuous manner. In embodiments, the samples 318 are constructed of a material similar to that which the laser processing system 300 modifies in its normal course of operation. For example, if the laser processing system 300 is a laser cutting apparatus, samples 318 may include workpieces constructed from a material (e.g., glass, polymeric material, or the like) that the laser processing system 300 may cut once calibrated.

As depicted in FIG. 3B, during the calibration process described herein, a plurality of test patterns 320 are formed in each of the samples 318. In the depicted example, each test pattern 322 in the plurality of test patterns 320 has the same shape (or is intended to have the same shape). In embodiments, each test pattern 322 in each of the samples 318 is formed at a different calibration distance in the range of calibration distances 326. In other words, each test pattern 322 of the plurality of test patterns 320 formed in each sample 318 may be formed with the support platform 302 being disposed at a different relative distance from the imaging system 308. In an example, a first one of the test patterns 322 in each of the samples 318 is formed at a first calibration distance 330 on a first side of the expected focal position 328 at a first end of the range of calibration distances 326 and a second one of the test patterns 322 in each of the samples 318 is formed at a second calibration distance 332 on a second side of the expected focal position 328 at a second end of the range of calibration distances 326. In embodiments, the first and second calibration distances 330 and 332 are equidistant from the expected focal position 328. A plurality of additional test patterns 322 are formed between the first and second test patterns formed at the first and second calibration distances 330 and 332. For example, between forming each test pattern 322 of the plurality of test patterns 320 in each sample 318, the controller 336 may provide a control signal to the support platform actuator 334 to cause the support platform actuator 334 to move the support platform 302 a predetermined increment (e.g., in the z-direction depicted in FIGS. 3A and 3B). As such, in embodiments, each individual test pattern 322 of the plurality of test patterns 320 formed in each sample 318 may be formed at a separate calibration distance from the expected focal position 328.

In embodiments, once the support platform 302 is positioned a desired calibration distance (e.g., within the range of calibration distances 326) the controller 336 provides control signals to the adjustable beam redirection element 310 to provide relative motion of the energy beam 316 relative to the support platform 302. For example, at the first calibration distance 330, the orientation of the adjustable beam redirection element 310 may be moved to a starting point of one of the test patterns 322. Once at the starting point, the controller 336 may control movements of the adjustable beam redirection element 310 such that the adjustable beam redirection element 310 moves in a predetermined movement pattern and the energy beam 316 is moved in a manner corresponding to the predetermined movement pattern to produce one of the test patterns 322.

While the support platform 302 is still at the first calibration distance 330, the controller 336 may orient of the adjustable beam redirection element 310 to another starting of another one of the test patterns 322 (e.g., another test pattern 322 at another one of the samples 318 disposed on the support platform 302). Such a process may be repeated until a test pattern 322 has been formed at the first calibration distance 330 in each of the samples 318 disposed on the support platform 302. Once a test pattern 322 is formed at the first calibration distance 330 in each of the samples 318, the support platform actuator 334 may be repositioned to adjust the calibration distance within the range of calibration distances 326 and additional test patterns may be formed in each of the samples 318 at the updated calibration distance. In embodiments, such a process may be repeated until each of the samples 318 includes the same number of test patterns at a set of calibration distances within the range of calibration distances 326. It should be understood that the movement pattern for the adjustable beam redirection element 310 and the support platform 302 is exemplary only and not meant to be limiting. For example, in embodiments, a plurality of test patterns 320 may be formed in an individual one of the samples 318 at a plurality of calibration distances prior to the energy beam 316 being repositioned to modify any of the other samples 318. Moreover, each of the samples 318 may have different numbers of test patterns in the plurality of test patterns 320 formed therein and each of the plurality of test patterns 320 in each sample 318 may be formed used a different set of calibration distances and different calibration distance ranges consistent with the present disclosure.

In embodiments, the predetermined movement patterns for the adjustable beam redirection element 310 used to generate the test patterns 322 in the samples 318 are multi-directional to incorporate the directional-dependencies in the energy density cross-section of the energy beam 316 caused by the imaging system 308. In embodiments, the predetermined movement patterns for the adjustable beam redirection element 310 contain at least two portions that extend at angles relative to one another. For example, in embodiments, the predetermined movement patterns are adapted to cause the energy beam to move in at two lines that extend at an angle relative to one another to account for an orientation of the energy density cross-section of the energy beam 316 being potentially misaligned with a movement direction of the energy beam 316 (e.g., as described herein with respect to FIG. 2B). More details with respect to movement patterns for the adjustable beam redirection element 310 are provided herein with respect to FIGS. 5B, 6A, 6B, 6C, and 6D herein.

Still referring to FIG. 3A, the laser processing system 300 also includes a detector 324. The detector 324 generates a calibration signal used to characterize the test patterns 322 formed in the samples 318 disposed on the support platform 302. The nature of the calibration signal generated by the detector 324 may vary depending on the implementation. For example, in embodiments, the detector 324 may include a camera that captures images of each of the samples 318 having the plurality of test patterns 320 formed therein. In embodiments, a user of the laser processing system 300 may view the images captured via the detector 324 to determine an accuracy of the expected focal position 328 based on numbers of complete test patterns in each of the plurality of test patterns 320. As described herein, each plurality of test patterns 320 may be formed using a set of a calibration distances within the range of calibration distances 326. In embodiments, the expected focal position 328 is centrally disposed within the range of calibration distances 326 and the set of calibration distances is selected such that each plurality of test patterns 320 includes equal numbers of test patterns disposed on either side of the expected focal position 328. In such a case, if the expected focal position 328 is accurate to a certain threshold, a number of complete test patterns on the first side of the expected focal position 328 (e.g., proximate to the first calibration distance 330) should equal a number of complete test patterns on the second side of the expected focal position (e.g., proximate to the second calibration distance 332).

As used herein, the term "complete test pattern" refers to a set of modifications to a sample that largely corresponds to a movement pattern of an energy beam. For example, if the adjustable beam redirection element 310 is adjusted to direct the energy beam 316 along a straight line having a predetermined length, a complete test pattern in this case would correspond to a sample 318 having a modification (e.g., melt pool) having a corresponding shape (e.g., the line having the predetermined length). If the energy beam 316 is out of focus and lacks the requisite energy density to modify the sample 318 in an intended manner such that the sample is not modified to possess a linear feature having the predetermined length, such a result is not characterized as a complete test pattern. In other words, if the energy beam 316 fails to modify the sample 318 in a desired manner at any point along a movement pattern for the energy beam 316, an incomplete test pattern would result.

In embodiments, the controller 336 includes an imaging processing module or the like that causes the controller 336 to analyse the images captured via the detector 324 to determine whether each test pattern 322 is complete in an automated manner. For example, the imaging processing module may compare each test pattern to a baseline test pattern (e.g., formed at the expected focal position 328) and determine that a particular test pattern 322 is complete if the shape of the test pattern 322 does not significantly differ the baseline test pattern. In embodiments, the controller 366 may count the number of test patterns characterized as complete on either side of the expected focal position 328 in order to determine whether the expected focal position is accurate. If there is a mismatch in the number of complete test patterns on either side of the expected focal position 328, the controller 336 may update the expected focal position for a particular location on the support platform 302 (e.g., corresponding to the sample 318) accordingly. For example, if a first number of complete test patterns on a first side of the expected focal position 328 is less than a second number of complete test patterns on a second side of the expected focal position 328, the controller may update the expected focal distance to be disposed on the second side of the initial expected focal position 328. This way, an expected focal position may be generated for various locations on support platform 302 to generate a calibration map for the laser processing system 300.

In embodiments, the energy beam 316 melts each of the samples 318 when directed through various portions of the samples 318 using the predetermined movement patterns of the adjustable beam redirection element 310 to generate the plurality of test patterns 320. The melting of the samples 318 may induce emissions 338. For example, in embodiments, the emissions 338 are melt pool optical emissions. The detector 324 may include an optical detector that generates a detection signal responsive to the emissions 338 produced in the process of forming a particular test pattern 322 that may be used to determine a completeness of the test pattern 322. For example, the detection signal may be compared to a signature response produced in forming a complete test pattern to determine a completeness of a particular one of the test patterns 322.

In embodiments, the detector 324 is a temperature sensor that measures a temperature of a sample 318 during a time period immediately following the generation of a particular test pattern 322 in the sample 318. For example, the detector 324 may determine a temperature of a laser heat affected zone (HAZ) of the sample 318 following the formation of a test pattern 322 to determine a completeness of the test pattern 322. While only a single detector 324 is depicted, it should be understood that the laser processing system 300 may include any number of detectors consistent with the present disclosure. For example, in embodiments, the laser processing system 300 includes one detector for each sample 318 placed on the support platform 302 during the calibration process described herein to reduce the amount of time needed to measure the response corresponding to each test pattern 322. In embodiments, the detector 324 (or each detector included in the laser processing system 300) may be movable (e.g., coupled to an articulating arm or other actuator, not depicted) to capture the response corresponding to each test pattern 322 formed in the samples 318.

Figure 4:
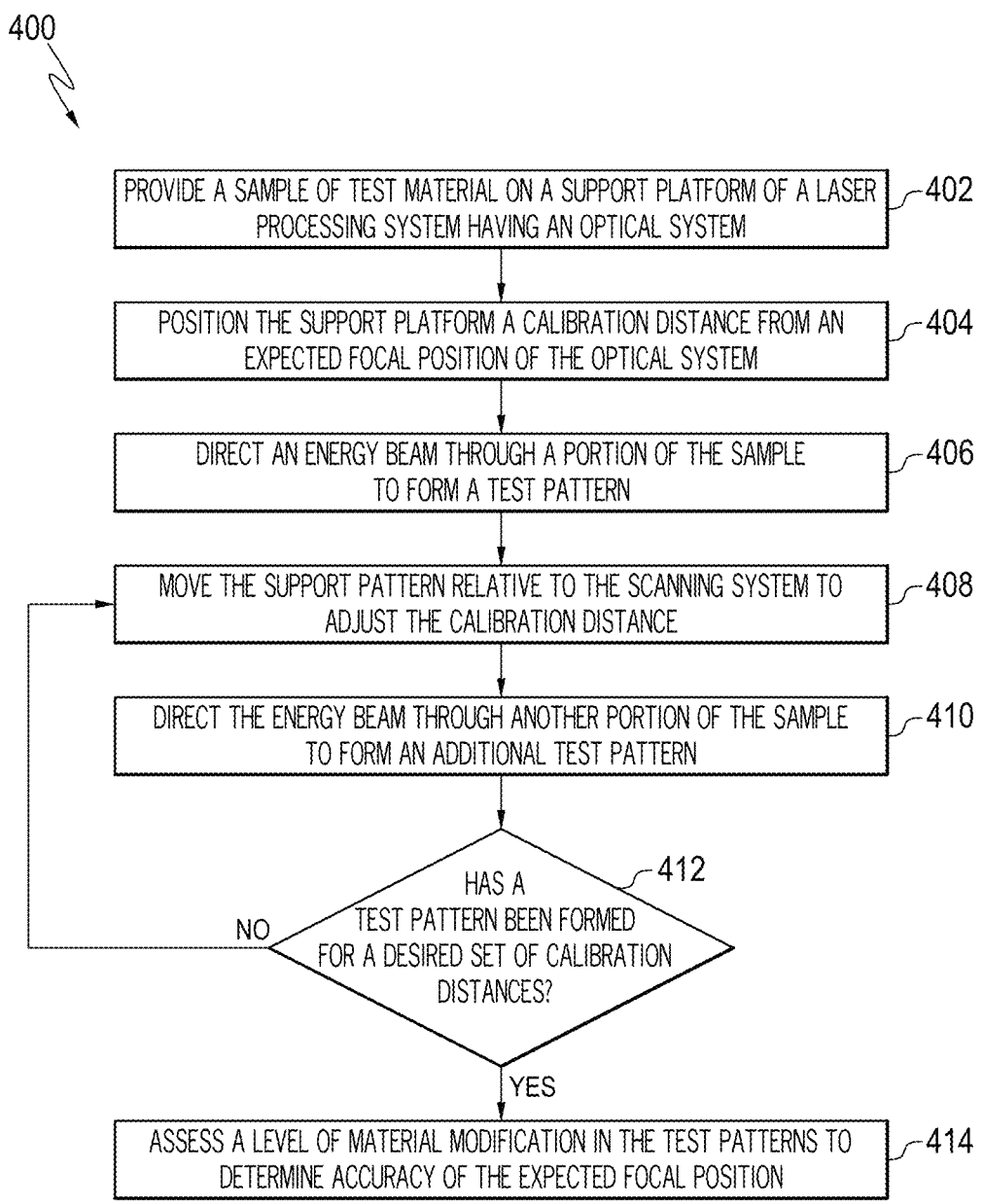
FIG. 4 depicts a calibration process for a laser processing system, according to one or more embodiments described herein.

Referring to FIG. 4, a flow diagram of a calibration process 400 is depicted. In embodiments, the calibration process 400 may be performed via the laser processing system 300 described herein with respect to FIGS. 3A and 3B to determine an accuracy for the expected focal position 328. In embodiments, the calibration process 400 may be performed a single time to characterize the optical system 304 throughout an entirety of a range of motion 312 of the energy beam 316. In embodiments the calibration process 400 may be performed to characterize the optical system 304 throughout only a portion of the range of motion 312 of the energy beam 316 (e.g., a portion of the range of motion 312 corresponding to one of the samples 318 depicted in FIG. 3B). In such embodiments, the calibration process 400 may be performed a number of different times to characterize the optical system 304 throughout the entirety of the range of motion 312.

In a block 402, a sample of test material is provided on the support platform 302 of the laser processing system 300. For example, a plurality of samples 318 may be placed on the support platform 302 in a predetermined arrangement. The predetermined arrangement may be the grid-like arrangement depicted in FIG. 3B. The test material may be any material capable of being modified by the energy beam 316 in a repeatable and detectable manner. For example, in embodiments, the test material is a metal foil that is melted via the energy beam 316 when the energy beam 316 possesses a requisite energy density. In embodiments, the test material is modified via the energy beam 316 to enough of an extent such that the modifications (e.g., melt pools) in the test material induced by the energy beam 316 are visible (e.g., via a microscope of via a naked eye of a user).

In a block 404, the support platform 302 is positioned a calibration distance from the expected focal position 428. In embodiments, the calibration distance is a first calibration distance 330 on a first side of the expected focal position 328 at a first end of a range of calibration distances 326. For example, the controller 336 may provide a control signal to the support platform actuator 334 to place the support platform 302 at a first relative distance from the imaging system 308 such that the sample 318 is placed the first calibration distance 330 from the expected focal position 328.

In a block 406, the energy beam 316 is directed through a portion of the sample 318 to form a test pattern. For example, the controller 336 may provide a plurality of control signals to the adjustable beam redirection element 310 to cause the adjustable beam redirection element 310 to direct the energy beam 316 in a predetermined movement pattern at the portion of the sample 318. Depending on the energy density possessed by the energy beam 316 at the sample 318, the energy beam 316 may modify the portion of the sample 318 to include a complete test pattern that corresponds in a shape of the movement pattern of the energy beam 316. If the energy beam 316 lacks the requisite energy density to melt the sample 318 (e.g., because the energy beam 316 is out of focus at the sample 318), an incomplete test pattern may result. In embodiments, after formation of a test pattern 322 in a first one of the samples 318, the controller 336 may transmit a control signal to the adjustable beam redirection element 310 to cause the adjustable beam redirection element 310 to direct the energy beam 316 to a starting point of an additional test pattern. The additional test pattern may be formed in a portion of another sample 318 placed on the support platform 302.

In a block 408, the support platform 302 is moved to adjust the calibration distance. For example, the controller 336 may provide a control signal to the support platform actuator 334 to advance the support platform 302 from the calibration distance to which the support platform 302 was initially moved at block 404 in a predetermined increment (e.g., 50 μm, 100 μm, 200 μm, 1 mm, or the like). In a block 410, the energy beam 316 is directed through another portion of the sample 318 to form an additional test pattern at the adjusted calibration distance. The adjusted calibration distance may alter the energy density of the energy density of the energy beam 316 to enough of an extent that the additional test pattern differs from the initial test pattern formed at block 406. In embodiments, additional test patterns may be formed in other samples 318 placed on the support platform 302 at the adjusted calibration distance.

In a block 412, the controller 336 determines whether a test pattern has been formed for a desired set of calibration distances. The set of calibration distances may vary depending on the implementation. For example, in embodiments, the set of calibration distances includes equal numbers of calibration distances on either side of the expected focal position 328 separated from one another by the predetermined increment. If a test pattern has not yet been formed for the desired set of calibration distances, the calibration process 400 reverts back to the block 408, the calibration distance is adjusted, and an additional test pattern is formed.

If a test pattern has been formed for each calibration distance of the desired set of calibration distances, the calibration process advances to the block 414, where the level of material modification in the test patterns is assessed to determine an accuracy of the expected focal position 328. Referring to FIGS. 5A, 5B, 5C, and 5D, a sample 500 having different pluralities of test patterns 512a, 512b, 512c, 512d formed therein are schematically depicted, respectively. In embodiments, depending on the implementation, the sample 500 includes first pluralities of test patterns 502a, 502b, 502c, and 502d formed on a first side of the expected focal position 328 and a second plurality of test patterns 504a, 504b, 504c, and 504d formed on a second side of the expected focal position 328.

Figures 5A, 5B:
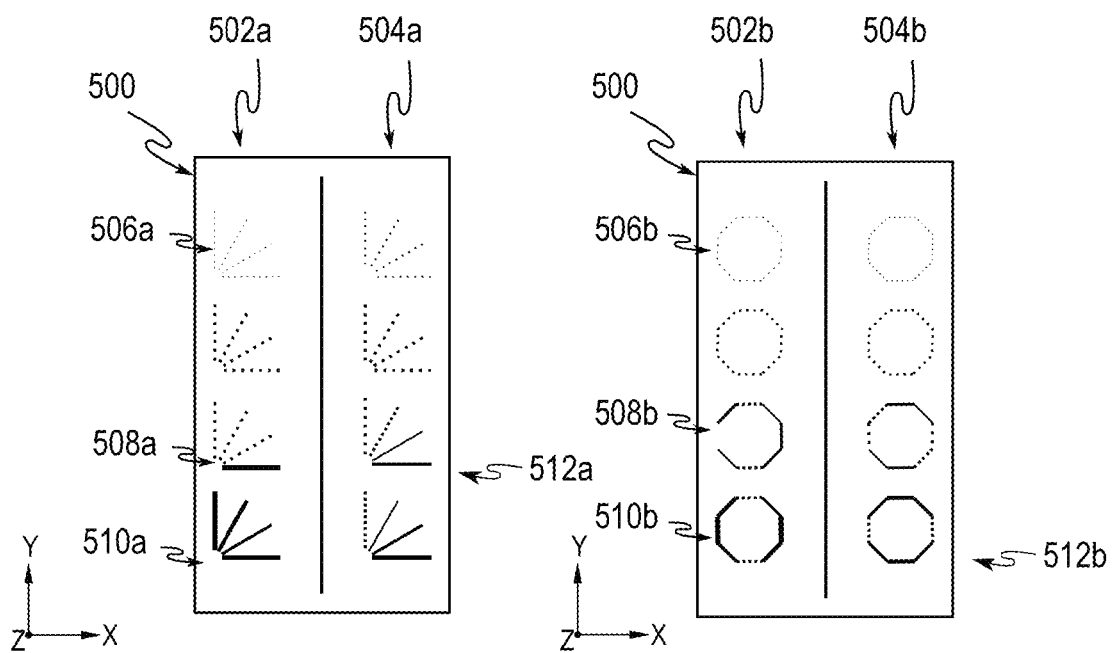
FIG. 5A schematically depicts a sample having a plurality of test patterns formed therein, according to one or more embodiments described herein.
FIG. 5B schematically depicts a sample having a plurality of test patterns formed therein, according to one or more embodiments described herein.
Figures 5C, 5D:
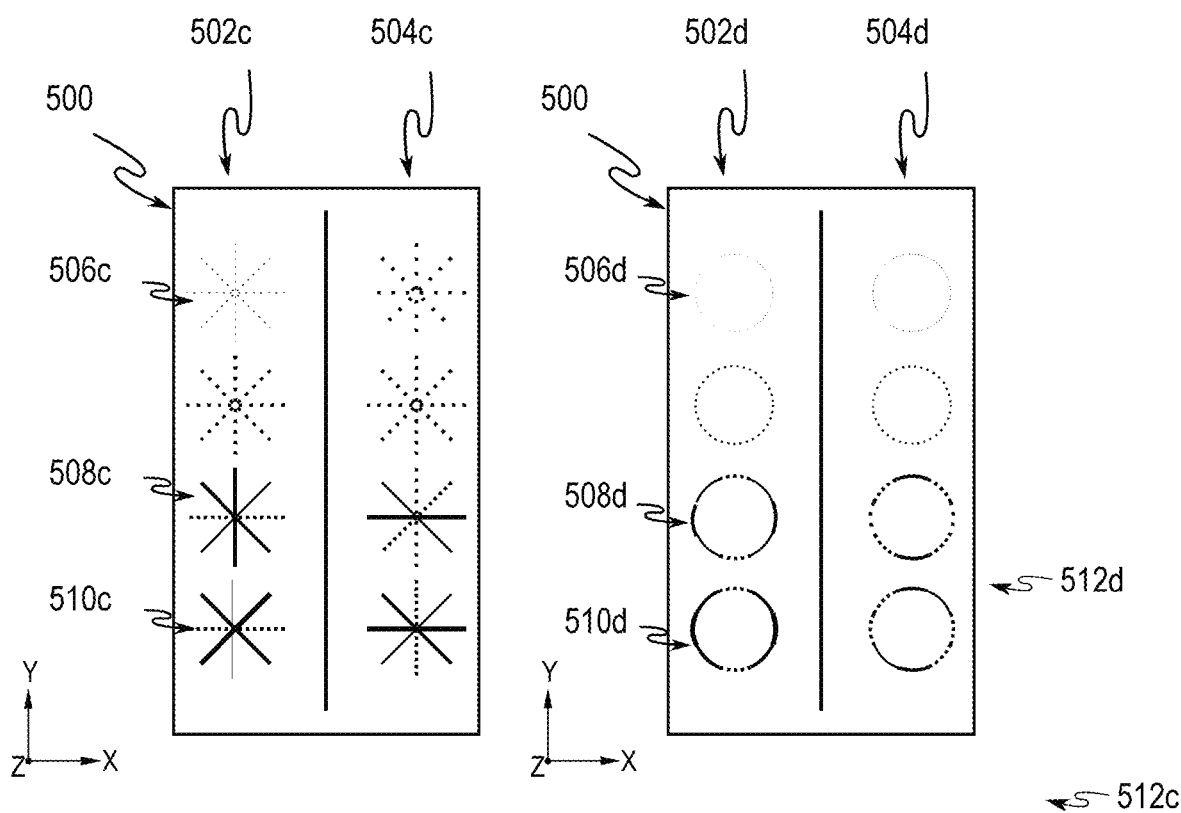
FIG. 5C schematically depicts a sample having a plurality of test patterns formed therein, according to one or more embodiments described herein.
FIG. 5D schematically depicts a sample having a plurality of test patterns formed therein, according to one or more embodiments described herein.

The different shapes of the pluralities of test patterns 502a, 502b, 502c, 502d, 504a, 504b, 504c, and 504d represent the various movement patterns for the energy beam 316 that may be used in performance of the calibration process 400. For example, each test pattern in the pluralities of test patterns 502a and 504a depicted in FIG. 5A includes a plurality of lines extending at acute angles relative to one another, such that the cross-section of energy beam 316 may be oriented differently relative to each of the lines. Each test pattern in the pluralities of test patterns 502b and 504b depicted in FIG. 5B is an octagonal shape comprising a plurality of connected linear segments extending at various angles to one another to test different relative orientations between cross-sectional shapes of the energy beam 316 and the scanning direction. Each test pattern in the pluralities of test patterns 502c and 504c depicted in FIG. 5C may be similar to the test patterns of the pluralities of test patterns 502a and 504a, except the lines intersect at centers thereof to form an asterisk pattern. Each test pattern in the pluralities of test patterns 502d and 504d is substantially circular-shaped such that the relative orientation between the cross-section of the energy beam 316 varies throughout the movement pattern of the energy beam 316.

Each test pattern in the pluralities of test patterns 502a, 502b, 502c, 502d, 504a, 504b, 504c, and 504d may have differing levels of completion (e.g., different levels of correspondence between the test pattern produced in the sample 500 and the movement pattern of the energy beam 316 through that portion of the sample). For example, as depicted in each of FIGS. 5A, 5B, 5C, and 5D, each of the first pluralities of test patterns 502a, 502b, 502c, and 502a includes a first test pattern 506a, 506b, 506c, and 506d, respectively (e.g., formed at the first calibration distance 330 at the end of the range of calibration distances 326), that is substantially incomplete and the sample 500 is hardly modified therein. Each of the first pluralities of test patterns 502*a*, 502*b*, 502*c*, and 502*d* further includes a second test pattern 508*a*, 508*b*, 508*c*, and 508*d*, respectively (e.g., formed at a calibration distance closer than the first calibration distance 330 within the range of calibration distances 326), that is substantially more noticeable (e.g., the sample 500 is modified to a greater extent therein) than in the first test patterns 506*a*, 506*b*, 506*c*, and 506*d*. Each of the first pluralities of test patterns 502*a*, 502*b*, 502*c*, and 502*a* further includes a third test pattern 510*a*, 510*b*, 510*c*, and 510*d*, respectively (e.g., formed at a different calibration distance than the second test patterns 508*a*, 508*b*, 508*c*, and 508*d*), that is even more complete and noticeable than the second test pattern 508*a*, 508*b*, 508*c*, and 508*d* in that sample 500.

Figure 5E:
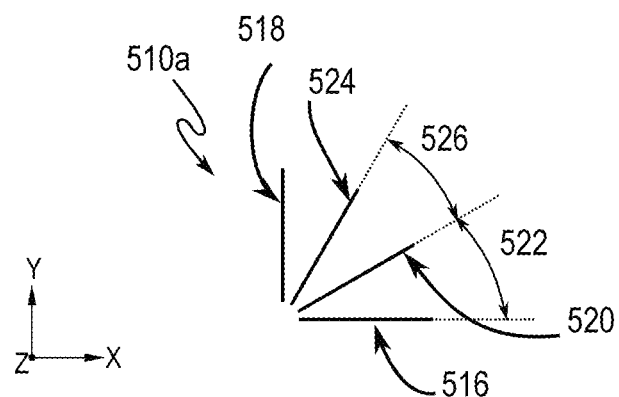
FIG. 5E schematically depicts one of the plurality of test patterns formed in the sample depicted in FIG. 5A, according to one or more embodiments described herein.

Referring now to FIG. 5E, third test pattern 510*a* of FIG. 5A is depicted in more detail. The third test pattern 510*a* is a complete test pattern, and therefore largely corresponds in shape to the movement pattern of the energy beam 316 over that portion of the sample 500. The test pattern 510*a* (and therefore the associated movement pattern of the energy beam 316 caused by the adjustable beam redirection element 310) includes a first line 516, a second line 518, a third line 520, and a fourth line 524. In embodiments, the first line 516 extends along a first major scanning axis of the adjustable beam redirection element 310. For example, the adjustable beam redirection element 310 may include a two axis galvo scanner having a first mirror rotatable to move the energy beam 316 along the first major axis (e.g., extending in the x-direction depicted in FIG. 5B) and a second mirror rotatable to move the energy beam 316 along a second major axis (e.g., extending the y-direction depicted in FIG. 5B). Combinations of movements of the first and second mirrors may move the energy beam along directions off the first and second major axes (e.g., along the third and fourth lines 520 and 524). Inclusion of the first and second lines 516 and 518 in the test pattern beneficially characterizes the energy density of the energy beam 316 along the major axes (e.g., to test an effect of rotating an orientation of an elliptical energy density cross-section of the energy beam 316 with respect to the movement direction of the energy beam 316 as described herein with respect to FIG. 2B). For example, in embodiments, when scanned along the sample 500 to produce the first line 516, the energy beam 316 may possess an elliptical cross-section having a major axis aligned with the movement direction of the energy beam 316 (e.g., similar to the second energy density cross-section 210 described with respect to FIG. 2B).

The third line 520 extends at a first acute angle 522 to the first line 516. The fourth line 524 extends at a second acute angle 526 from the third line 520. Inclusion of the third and fourth lines 520 and 524 extending at differing angles from the first line 516 facilitates taking different orientations of the energy density cross-section of the energy beam 316 with respect to the movement direction of the energy beam 316 into account. For example, referring back to FIG. 5A, in the second test pattern 508*b*, the first line 516 appears to be substantially complete and correspond to the first line 516 in the third test pattern 510*a*. However, the second, third, and fourth lines 518, 520, and 524 in the second test pattern 508*a* are substantially incomplete (e.g., the sample 500 is not modified to the same extent along the second, third, and fourth lines 518, 520, and 524 in the second test pattern 508*a* as compared to the third test pattern 510*a*). Such a difference between the second test pattern 508*a* and the third test pattern 510*a* may result from a misalignment of energy density cross-section of the energy beam 316 with the direction of movement along second, third, and fourth lines 518, 520, and 524. While such misalignment may still be present during the production of the third test pattern 510*a*, the third test pattern 510*a* may be produced at a smaller calibration distance from the expected focal position 328. As such, during generation of the third test pattern 510*a*, the energy beam 316 generally possesses a higher energy density than when generating the second test pattern 508*a* and thus generate a more complete test pattern.

Figure 5F:
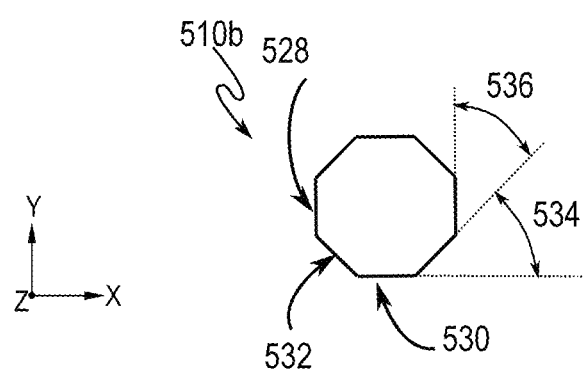
FIG. 5F schematically depicts one of the plurality of test patterns formed in the sample depicted in FIG. 5B, according to one or more embodiments described herein.

Referring now to FIG. 5F, the third test pattern 510*b* of FIG. 5B is depicted in more detail. In embodiments, the third test pattern 510*b* is substantially complete, such that the sample 500 is modified in a manner that largely corresponds to the movement pattern of the energy beam 316. As depicted, the third test pattern 510*b* is substantially octagonal-shaped, comprising a first set of segments 528 extending in a first direction (e.g., the Y-direction depicted in FIG. 5F) and a second set of segments 530 extending in a second direction (e.g., the X-direction depicted in FIG. 5F). In embodiments, the first and second sets of segments 528 and 530 extend along major scanning axes of the adjustable beam redirecting element 310 to test the material modification capability of the energy beam 316 along those axes. A third set of segments 532 connects the first and second sets of segments 528 and 530. The third set of segments may extend at a first angle 534 to the second set of segments 530 and a second angle 536 to the first set of segments 528. In embodiments, the first angle 534 equals the second angle 536 to form an octagonal shape, though various values for the first and second angles 534 and 536 may be chosen throughout the third test pattern 510*b* in order to test different relative orientations of the energy beam 316 and the movement direction thereof.

As exemplified by the preceding discussion, various multi-directional movement patterns of the energy beam 316 used in the calibration process 400, such that that the calibration process 400 incorporates various directional dependencies of the energy density of the energy beam 316, thus providing a more complete characterization of the ability of the energy beam 316 to modify the test material. Additionally, it should be appreciated that different movement patterns of the energy beam 316 may be used over a single iteration of the calibration process 400.

In embodiments, to determine an accuracy of the expected focal position 328, a user of the laser processing system 300 counts a number of complete test patterns formed on either side of the expected focal position 328. In embodiments, the controller 336 may identify the numbers of complete test patterns through an image comparison algorithm. In the example depicted in FIG. 5A, the first plurality of test patterns 502*a* appears to include approximately 1 complete test pattern, whereas the second plurality of test patterns 504*a* appears to include approximately 0 complete test patterns. Such an imbalance indicates that an actual focal position of the optical system 304 is on the first side of the expected focal position 328. In embodiments, based on the numbers of complete test patterns on each side of the expected focal position, the controller 336 may update the expected focal position. In embodiments, the calibration process 400 may be repeated using the updated expected focal position to determine an accuracy of the updated expected focal position.

Figure 6:
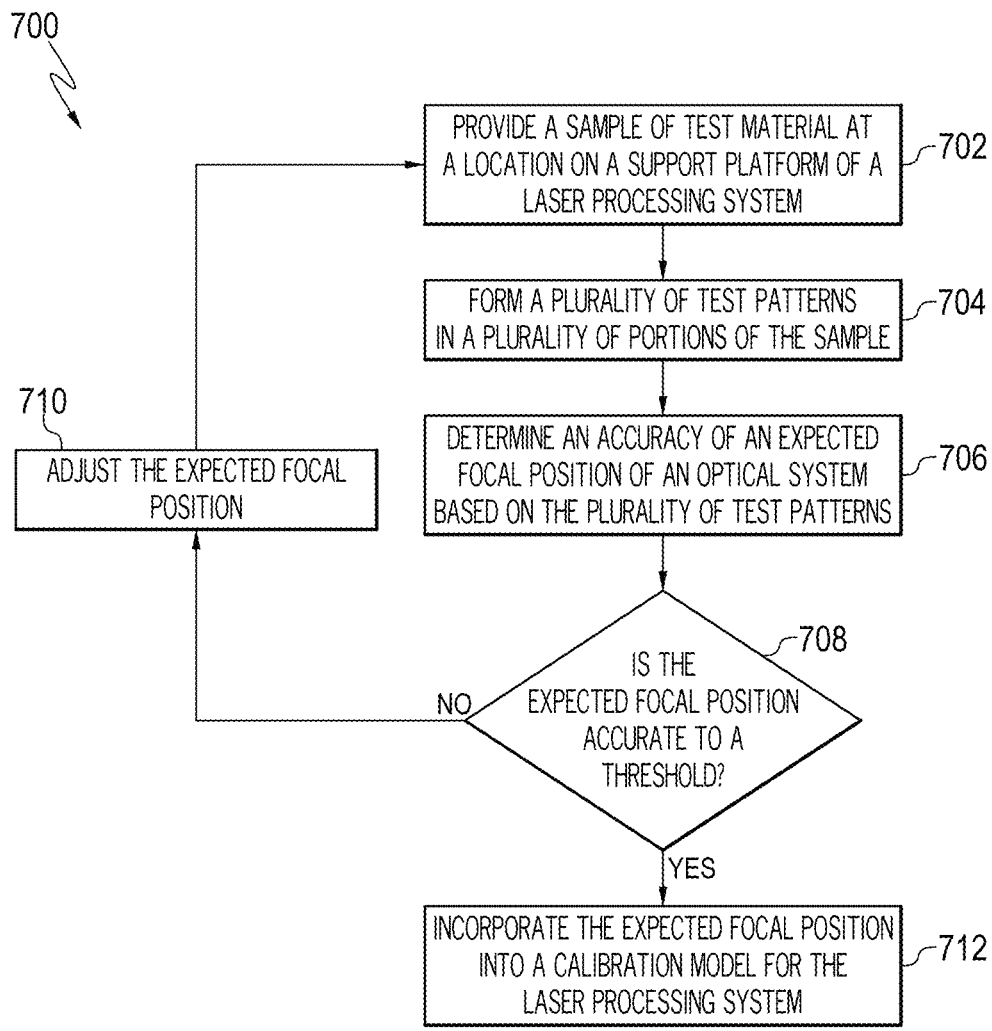
FIG. 6 depicts a method of incorporating an expected focal position into a calibration model for an optical system, according to one or more embodiments described herein.

Referring to FIG. 6, a flow diagram of a calibration process 700 is depicted. In embodiments, the calibration process 700 may be performed via the laser processing system 300 described herein with respect to FIGS. 3A and 3B to incorporate an expected focal position 328 of the optical system 304 into a calibration model of the laser processing system 300. For example, the expected focal position 328 may be associated with a particular location on the support platform 302 (e.g., such that the energy beam 316 significantly deviates from the home position 314). In embodiments, the process 700 may be repeated for a plurality of different locations on the support platform 302 to determine an accuracy of a plurality of expected focal positions of the optical system 304 and generate a three-dimensional calibration map for the optical system 304.

In a block 702, a sample of test material is provided on the support platform 302 of the laser processing system 300. For example, a sample 318 may be placed on the support platform 302. In embodiments, a plurality of samples 318 may be placed on the support platform 302 in a predetermined arrangement. The predetermined arrangement may be the grid-like arrangement depicted in FIG. 3B. The test material may be any material capable of being modified by the energy beam 316 in a repeatable and detectable manner. For example, in embodiments, the test material is a metal foil that is melted via the energy beam 316 when the energy beam 316 possesses a requisite energy density. In embodiments, the test material is modified via the energy beam 316 to enough of an extent such that the modifications (e.g., melt pools) in the test material induced by the energy beam 316 are visible (e.g., via a microscope of via a naked eye of a user).

In a block 704, a plurality of test patterns are formed in a plurality of portions of the sample. For example, in embodiments, the block 704 may correspond to the blocks 404, 406, 408, 410, and 412 of the calibration process 400 described with respect to FIG. 4 such that a plurality of test patterns are formed at various portions of the sample 318 at various different calibration distances from an expected focal position of the optical system 304. To form each test pattern, the energy beam 316 may be moved in a multi-directional movement pattern described herein.

In a block 706, an accuracy of the expected focal position of the optical system 304 is determined based on the plurality of test patterns formed at block 704. In embodiments, during the block 706, the controller 336 may analyse an image (e.g., similar to the image of the sample 500 described with respect to FIG. 5A) to determine numbers of complete test patterns disposed on either side of the expected focal position to assess the accuracy of the expected focal position. In embodiments, additional aspects of the test patterns may be assessed in determining the accuracy of the expected focal position. For example, in embodiments, the detector 324 may measure emissions from a melt pool (e.g., when the samples 318 are metal articles) by generating detection signals by measuring the emissions 338 (e.g., infrared components thereof) during the formation of the plurality of test patterns. In embodiments, a camera (e.g., co-located with the detector 324 and/or incorporated with the detector 324) captures images of melt pools during the formation of the plurality of test patterns. In embodiments, after the plurality of test patterns are formed, the samples 318 are divided into at least one section (e.g., a cross-section extending through at least a portion of the plurality of the test patterns and extending perpendicular to the movement directions of the energy beam 316 in the plurality of movement patterns). After division into the at least one section, the samples 318 may be polished, and examined under a microscope to measure the melt or burn cross-section of the plurality of test patterns in assessing the completeness of the test pattern or the accuracy of the expected focal position.

In a block 708, the controller 336 determines if the expected focal position is accurate to a threshold. For example, if the numbers of complete test patterns on either side of the expected focal position are not substantially equal (e.g., are equal or differ from one another by less than a threshold such as 2), the controller 336 may determine that the expected focal position is not accurate and adjust the expected focal position in a block 710. In embodiments, after adjusting the expected focal position, the calibration process 700 may be repeated to determine an accuracy of the adjusted expected focal position.

In embodiments, if the numbers of complete test patterns on either side of the expected focal position are substantially equal (e.g., are equal or differ from one another by less than a threshold such as 2), the controller 336 determines that the expected focal position is sufficiently accurate and incorporates the expected focal position into a calibration model for the laser processing system 300. For example, the expected focal position may be associated with a particular location (e.g., a position of the center of the sample 318 when the test patterns were formed during the block 704) on the support platform 302 and used in the process of forming various movement patterns for the energy beam 316 for processing future workpieces.

In view of the foregoing description, it should now be understood that moving an energy beam in a multi-directional movement pattern to form a plurality of test patterns in a sample of test material in order to assess an accuracy of an expected focal position of an optical system provides for a more accurate assessment of the focal position than existing methods. In particular, such a method incorporates various directional dependencies of the optical system into the formation of the test patterns, thereby providing a more complete characterization of the optical system and thus facilitating the generation of more accurate calibration maps for determining specific locations where the laser processing apparatus possesses sufficient energy density to modify workpieces in a desired manner.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the specific value or end-point referred to is comprised. Whether or not a numerical value or end-point of a range in the specification recites "about," two embodiments are described: one modified by "about," and one not modified by "about." It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, comprising: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" comprise plural referents unless the context clearly dictates otherwise. Thus, for example, reference to "a" component comprises aspects having two or more such components, unless the context clearly indicates otherwise.

Further aspects of the disclosure are provided by the subject matter in the following clauses:

1. A method of characterizing an optical system of a laser processing system, the method comprising directing an energy beam through a plurality of portions of a sample by adjusting an orientation of an adjustable beam redirection element of the optical system in accordance with a predetermined movement pattern to form a plurality of test patterns in the sample at each portion, wherein: the optical system comprises an imaging system having an expected focal position, the movement pattern comprises a plurality of movements such that the energy beam is directed in a plurality of different directions in the sample in the formation of each test pattern, and at least two of the plurality of test patterns are formed at different calibration distances from an expected focal position of the optical system; and determining an accuracy of the expected focal position of the imaging system by detecting a level of modification in the sample caused by the energy beam at the plurality of test patterns.

2. The method according to any preceding clause, wherein the movement pattern further comprises a first line extending in a first direction and a second line extending in a second direction at a first angle acute to the first direction.

3. The method according to any preceding clause, wherein the movement pattern further comprises a third line extending in a third direction at a second angle acute to the first direction, wherein the second angle is greater than the first angle.

4. The method according to any preceding clause, wherein the plurality of movements of the movement pattern direct the energy beam in a non-linear curve at the sample.

5. The method according to any preceding clause, wherein, as the energy beam is directed in a direction of the plurality of different directions during the movement pattern, an energy density cross section of the energy beam is misaligned with the direction.

6. The method according to any preceding clause, wherein each of the plurality of test patterns in the sample is formed at a different calibration distance within a range of calibration distances from the expected focal position, a first one of the test patterns is formed at a first end calibration distance on a first side of the expected focal position, a second one of the test patterns is formed at a second end calibration distance on a second side of the expected focal position, and the expected focal position is disposed centrally between the first end calibration distance and the second end calibration distance.

7. The method according to any preceding clause, wherein the plurality of test patterns comprises a plurality of additional test patterns between the first test pattern and the second test pattern, wherein the plurality of additional test patterns are formed at equally spaced calibration distances between the first end calibration distance and the second end calibration distance.

8. The method according to any preceding clause, wherein determining the accuracy of the expected focal position of the optical system comprises determining a first number of complete test patterns on the first side of the expected focal position and a second number of complete test patterns on the second side of the expected focal position.

9. The method of according to any preceding clause, wherein determining the accuracy of the expected focal position comprises: capturing an image of the sample containing the plurality of test patterns using a detector; and processing the image using a computing system communicably coupled to the detector in order to determine a completeness of at least one of the plurality of test patterns.

10. The method according to any preceding clause, wherein: the sample comprises a metal article, the metal article comprising at least one of an ingot, a three-dimensional metal article, and a plate, and directing the energy beam through the plurality of portions of the sample to form the plurality of test patterns melts the metal article at each of the plurality of portions and generates a melt pool.

11. The method according to any preceding clause, wherein the sample further comprises a powder layer disposed on a surface of the metal article.

12. The method according to any preceding clause, wherein determining the accuracy of the expected focal position comprises at least one of: measuring electromagnetic emissions from the melt pool during the formation of the plurality of test patterns; capturing an image of the melt pool during the formation of the plurality of test patterns using a detector; and examining a cross-section of the sample using a microscope, the cross section being taken in a plane perpendicular to the plurality of test patterns within at least a portion of the plurality of test patterns.

13. The method according to any preceding clause, wherein the sample comprises laser paper and the plurality of test patterns comprise burned areas on the sample.

14. A method of determining a focal position of an optical system of a laser processing system, the method comprising: positioning a sample a plurality of different distances of a distance range from the optical system, wherein the distance range includes an expected focal position of the optical system; for each distance, directing an energy beam through a separate portion of the sample in a predetermined movement pattern using an adjustable beam redirection element of the laser processing system to form a plurality of test patterns in the sample at each portion, wherein the movement pattern comprises a plurality of movements such that the energy beam is directed in a plurality of different directions in the sample in the formation of each test pattern; and inspecting the plurality of test patterns to determine whether the expected focal position matches or substantially matches an actual focal distance of the optical system.

15. The method according to any preceding clause, wherein the predetermined movement pattern comprises a plurality of lines, each of the plurality of lines extending in different directions, wherein at least two of the plurality of lines extend at acute angles to a major axis of the adjustable beam redirection element.

16. The method according to any preceding clause, wherein the plurality of movements of the movement pattern direct the energy beam in a non-linear curve at the sample.

17. The method according to any preceding clause, wherein the expected focal position of the optical system is at a center of the distance range, where the plurality of distances are equally spaced throughout the distance range, wherein inspecting the plurality of test patterns to determine whether the expected focal position matches or substantially matches an actual focal distance of the optical system comprises determining numbers of complete test patterns on either side of the expected focal position.

18. A laser processing system comprising: an energy beam source configured to emit an energy beam; an adjustable beam redirection element configured to direct the energy beam towards a support platform based on a configuration of the adjustable beam redirection element; a support platform actuator coupled to the support platform, wherein the support platform actuator is movable in a direction to adjust a distance between the support platform and the adjustable beam redirection element; an optical system disposed between the energy beam source and the support platform, the optical system having a focal position where an energy density of the energy beam is a maximum; a detector having a field of view that captures the support platform; and a controller communicably coupled to each of the adjustable beam redirection element, the support platform actuator, and the detector, the controller configured to: direct the support platform to move to a plurality of distances of a distance range from the adjustable beam redirection element, wherein the distance range includes an expected focal position of the optical system; for each distance of the plurality of distances, cause the adjustable beam redirection element to direct the energy beam through a separate portion of a sample placed on the support platform in a predetermined movement pattern to form a plurality of test patterns in the sample at each portion, wherein the predetermined movement pattern comprises a plurality of movements such that the energy beam is directed in a plurality of different directions in the sample in the formation of each test pattern; capture an image containing the plurality of test patterns using the detector; and analyse the image to determine an accuracy of the expected focal position based on an amount of material modification in the sample at each of the plurality of test patterns.

19. The scanning system according to any preceding clause, wherein the predetermined movement pattern comprises a plurality of lines, each of the plurality of lines extending in different directions.

20. The scanning system according to any preceding clause, wherein the sample comprises a metal foil, wherein directing the energy beam through the portions of the sample to form the plurality of test patterns melts the metal foil at each of the portions and generates a melt pool.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. A method of characterizing an optical system of a laser processing system, the method comprising:
   directing an energy beam through a plurality of portions of a sample by adjusting an orientation of an adjustable beam redirection element of the optical system in accordance with a predetermined movement pattern to form a plurality of test patterns in the sample at each portion, wherein:
   the optical system comprises an imaging system having an expected focal position,
   the movement pattern comprises a plurality of movements such that the energy beam is directed in a plurality of different directions in the sample in the formation of each test pattern, and
   at least two of the plurality of test patterns are formed at different calibration distances from an expected focal position of the optical system;
   determining an accuracy of the expected focal position of the imaging system by detecting a level of modification in the sample caused by the energy beam at the plurality of test patterns; and
   adjusting the expected focal position of the imaging system in response to the determined accuracy of the expected focal position.

2. The method of claim 1, wherein the movement pattern further comprises a first line extending in a first direction and a second line extending in a second direction at a first angle acute to the first direction.

3. The method of claim 2, wherein the movement pattern further comprises a third line extending in a third direction at a second angle acute to the first direction, wherein the second angle is greater than the first angle.

4. The method of claim 1, wherein the plurality of movements of the movement pattern direct the energy beam in a non-linear curve at the sample.

5. The method of claim 1, wherein, as the energy beam is directed in a direction of the plurality of different directions during the movement pattern, an energy density cross section of the energy beam is misaligned with the direction.

6. The method of claim 1, wherein:
   each of the plurality of test patterns in the sample is formed at a different calibration distance within a range of calibration distances from the expected focal position,
   a first one of the test patterns is formed at a first end calibration distance on a first side of the expected focal position,
   a second one of the test patterns is formed at a second end calibration distance on a second side of the expected focal position, and
   the expected focal position is disposed centrally between the first end calibration distance and the second end calibration distance.

7. The method of claim 6, wherein the plurality of test patterns comprises a plurality of additional test patterns between the first test pattern and the second test pattern, wherein the plurality of additional test patterns are formed at equally spaced calibration distances between the first end calibration distance and the second end calibration distance.

8. The method of claim 7, wherein determining the accuracy of the expected focal position of the optical system comprises determining a first number of complete test patterns on the first side of the expected focal position and a second number of complete test patterns on the second side of the expected focal position.

9. The method of claim 1, wherein determining the accuracy of the expected focal position comprises:
   capturing an image of the sample containing the plurality of test patterns using a detector; and
   processing the image using a computing system communicably coupled to the detector in order to determine a completeness of at least one of the plurality of test patterns.

10. The method of claim 1, wherein:
the sample comprises a metal article, the metal article comprising at least one of an ingot, a three-dimensional metal article, and a plate, and
directing the energy beam through the plurality of portions of the sample to form the plurality of test patterns melts the metal article at each of the plurality of portions and generates a melt pool.

11. The method of claim 10, wherein the sample further comprises a powder layer disposed on a surface of the metal article.

12. The method of claim 10, wherein determining the accuracy of the expected focal position comprises at least one of:
measuring electromagnetic emissions from the melt pool during the formation of the plurality of test patterns;
capturing an image of the melt pool during the formation of the plurality of test patterns using a detector; and
examining a cross-section of the sample using a microscope, the cross section being taken in a plane perpendicular to the plurality of test patterns within at least a portion of the plurality of test patterns.

13. The method of claim 1, wherein the sample comprises laser paper and the plurality of test patterns comprise burned areas on the sample.

14. A method of determining a focal position of an optical system of a laser processing system, the method comprising:
positioning a sample a plurality of different distances of a distance range from the optical system, wherein the distance range includes an expected focal position of the optical system;
for each distance, directing an energy beam through a separate portion of the sample in a predetermined movement pattern using an adjustable beam redirection element of the laser processing system to form a plurality of test patterns in the sample at each portion, wherein the movement pattern comprises a plurality of movements such that the energy beam is directed in a plurality of different directions in the sample in the formation of each test pattern;
inspecting the plurality of test patterns to determine an accuracy of the expected focal position; and
adjusting the expected focal position of the imaging system in response to the determined accuracy of the expected focal position.

15. The method of claim 14, wherein the predetermined movement pattern comprises a plurality of lines, each of the plurality of lines extending in different directions, wherein at least two of the plurality of lines extend at acute angles to a major axis of the adjustable beam redirection element.

16. The method of claim 14, wherein the plurality of movements of the movement pattern direct the energy beam in a non-linear curve at the sample.

17. The method of claim 14, wherein the expected focal position of the optical system is at a center of the distance range, where the plurality of distances are equally spaced throughout the distance range, wherein inspecting the plurality of test patterns further comprises determining numbers of complete test patterns on either side of the expected focal position.

18. A laser processing system comprising:
an energy beam source configured to emit an energy beam;
an adjustable beam redirection element configured to direct the energy beam towards a support platform based on a configuration of the adjustable beam redirection element;
a support platform actuator coupled to the support platform, wherein the support platform actuator is movable in a direction to adjust a distance between the support platform and the adjustable beam redirection element;
an optical system disposed between the energy beam source and the support platform, the optical system having a focal position where an energy density of the energy beam is a maximum;
a detector having a field of view that captures the support platform; and
a controller communicably coupled to each of the adjustable beam redirection element, the support platform actuator, and the detector, the controller configured to:
direct the support platform to move to a plurality of distances of a distance range from the adjustable beam redirection element, wherein the distance range includes an expected focal position of the optical system;
for each distance of the plurality of distances, cause the adjustable beam redirection element to direct the energy beam through a separate portion of a sample placed on the support platform in a predetermined movement pattern to form a plurality of test patterns in the sample at each portion, wherein the predetermined movement pattern comprises a plurality of movements such that the energy beam is directed in a plurality of different directions in the sample in the formation of each test pattern;
capture an image containing the plurality of test patterns using the detector; and
analyze the image to determine an accuracy of the expected focal position based on an amount of material modification in the sample at each of the plurality of test patterns.

19. The scanning system of claim 18, wherein the predetermined movement pattern comprises a plurality of lines, each of the plurality of lines extending in different directions.

20. The scanning system of claim 18, wherein the sample comprises a metal foil, wherein directing the energy beam through the portions of the sample to form the plurality of test patterns melts the metal foil at each of the portions and generates a melt pool.

* * * * *